United States Patent
Tane

(10) Patent No.: US 10,838,249 B2
(45) Date of Patent: Nov. 17, 2020

(54) VEHICLE DISPLAY APPARATUS

(71) Applicant: DENSO CORPORATION, Kariya (JP)

(72) Inventor: Seigo Tane, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/318,149

(22) PCT Filed: Jun. 9, 2017

(86) PCT No.: PCT/JP2017/021417
§ 371 (c)(1),
(2) Date: Jan. 16, 2019

(87) PCT Pub. No.: WO2018/016222
PCT Pub. Date: Jan. 25, 2018

(65) Prior Publication Data
US 2019/0302521 A1    Oct. 3, 2019

(30) Foreign Application Priority Data

Jul. 21, 2016    (JP) .................................. 2016-143297

(51) Int. Cl.
*G02F 1/1335*    (2006.01)
*B60K 35/00*    (2006.01)
(Continued)

(52) U.S. Cl.
CPC ........ *G02F 1/133524* (2013.01); *B60K 35/00* (2013.01); *G01D 11/28* (2013.01); *G02F 1/133528* (2013.01); *G02F 1/133606* (2013.01)

(58) Field of Classification Search
CPC ......... G02F 1/133524; G02F 1/133528; G02F 1/133606; G02F 1/1336;
(Continued)

(56) References Cited

U.S. PATENT DOCUMENTS 6,144,424 A * 11/2000 Okuda ................. G01C 21/265
349/65
2004/0257496 A1* 12/2004 Sonoda ............. G02F 1/133526
349/95

(Continued)

FOREIGN PATENT DOCUMENTS

| JP | 11242182 A | * | 9/1999 |
| JP | 2007057350 A | | 3/2007 |
| JP | 2009096380 A | | 5/2009 |

OTHER PUBLICATIONS

English translation of JPH11242182A, Title: Picture Display Device, Author: Suzuki Motofumi; Taga Yasunori; Date of publication: Sep. 7, 1999 (Year: 1999).*

*Primary Examiner* — Shan Liu
(74) *Attorney, Agent, or Firm* — Harness, Dickey & Pierce, P.L.C.

(57) ABSTRACT

A backlight is located on an incident side of a liquid crystal cell with a space. A first polarizing plate between the liquid crystal cell and the backlight is spaced from the liquid crystal cell. A second polarizing plate is located on an outgoing side of the liquid crystal cell. A light guiding plate is located between the liquid crystal cell and the first polarizing plate with a space from the liquid crystal cell to transmit a part of light and to guide the light to enter the liquid crystal cell. The display unit and the emitting unit are separately provided. The polarizing axes of the first polarizing plate and the second polarizing plate extend in different directions. When linearly polarized light after passing through the first polarizing plate enters the second polarizing plate, the second polarizing plate shuts off the linearly polarized light.

4 Claims, 3 Drawing Sheets

(51) Int. Cl.
   *G02F 1/13357* (2006.01)
   *G01D 11/28* (2006.01)
(58) Field of Classification Search
   CPC ........ G02F 2001/133607; G02F 2001/133616;
            G02F 1/133504; G02F 1/133615; G02F
            1/133308; G02F 2001/133317; G02F
            2001/133322; G02F 1/0311; G02F 1/116;
            G02F 1/1335; G02F 1/133536; G02F
            1/13362; G02F 1/133533; G02F
            2001/133531; G02F 2001/133521; G02F
            2001/13356; G02F 2001/133538; G02F
            2001/133541; G02F 2001/133543; G02F
            2001/133545; G02F 2001/133548; G02F
            2001/13355; G02F 2001/133562; G02F
            2001/133567; G02F 2203/16; G01D 7/00;
            G01D 11/28; B60K 35/00; G02B 6/0011;
            G02B 6/0013; G02B 6/0015; G02B
            6/0016; G02B 6/0018; G02B 6/002;
            G02B 6/0021; G02B 6/0023; G02B
            6/0025; G02B 6/0026; G02B 6/0028;
            G02B 6/003; G02B 6/0031; G02B
            6/0088; G02B 6/005; G02B 6/0068;
            G02B 6/0073; G02B 6/0083; G02B
            5/3033; G02B 6/0056; G02B 6/02109;
            B29D 11/00644; B32B 17/10458; B32B
            2307/42; H01L 51/5293; H01R 12/7005;
            H04B 10/532; G01J 5/0825; G03F
            9/7065; G01R 33/3678; C09K 19/0208
   USPC ........................................ 349/61–65, 96–103
   See application file for complete search history.

(56) References Cited

U.S. PATENT DOCUMENTS

| | | | |
|---|---|---|---|
| 2005/0212994 A1* | 9/2005 | Usami | G02F 1/133509 349/66 |
| 2007/0217010 A1* | 9/2007 | Lippey | G02B 27/0018 359/487.02 |
| 2014/0347606 A1* | 11/2014 | Park | G02B 6/0036 349/65 |
| 2016/0216553 A1* | 7/2016 | Otani | G02F 1/1336 |
| 2016/0299341 A1* | 10/2016 | Yoshida | G02F 1/134309 |

* cited by examiner

VEHICLE DISPLAY APPARATUS

CROSS REFERENCE TO RELATED APPLICATIONS

This application is a U.S. National Phase Application under 35 U.S.C. 371 of International Application No. PCT/JP2017/021417 filed on Jun. 9, 2017. This application is based on and claims the benefit of priority from Japanese Patent Application No. 2016-143297 filed on Jul. 21, 2016. The entire disclosures of all of the above applications are incorporated herein by reference.

TECHNICAL FIELD

The present disclosure relates to a vehicle display apparatus mountable on a vehicle and configured to display an image.

BACKGROUND ART

Conventionally, a vehicle display apparatus displays an image by utilizing light emitted from a light source. As one kind of the vehicle display apparatus, a liquid crystal display device incorporated in a dash panel facing a driver's seat is known. In such a vehicle display apparatus, a liquid crystal display device displays a meter image showing a vehicle speed, and the meter image is visually recognized by an occupant (see, for example, Patent Document 1).

Conventionally, a liquid crystal display device is incorporated in a dash panel. However, in a configuration where a display unit is raised on the dash panel, for example, entirety of the liquid crystal display device is needed to be installed on the dash panel. In this case, most of the space above the dash panel is occupied by the liquid crystal display device, and therefore, there is a concern that its appearance would be impaired.

PRIOR TECHNICAL LITERATURE

Patent Literature

PATENT LITERATURE 1: JP 2009-96380 A

SUMMARY OF INVENTION

It is an object of the present disclosure to provide a vehicle display apparatus configured to enhance appearance of a display unit.

According to one aspect of the present disclosure, a vehicle display apparatus is mountable on a vehicle and configured to display an image. The vehicle display apparatus comprises a liquid crystal cell (31) including a pair of translucent circuit boards having a liquid crystal layer therebetween. The vehicle display apparatus further comprises a backlight (21) located on a light incident side of the liquid crystal cell, spaced from the liquid crystal cell, and configured to emit light. The vehicle display apparatus further comprises a first polarizing plate (22) located between the liquid crystal cell and the backlight and spaced from the liquid crystal cell. The vehicle display apparatus further comprises a second polarizing plate (32) located on a light outgoing side of the liquid crystal cell. The vehicle display apparatus further comprises a light guiding plate (23) located between the liquid crystal cell and the first polarizing plate and spaced from the liquid crystal cell. The light guiding plate (23) is configured to transmit a part of light after passing through the first polarizing plate and to guide the transmitted light to enter the liquid crystal cell. The display unit (30), which includes the liquid crystal cell and the second polarizing plate, and the emitting unit (20), which includes the backlight, the first polarizing plate, and the light guiding plate, are separately provided. A polarizing axis of the first polarizing plate and a polarizing axis of the second polarizing plate extend in different directions. When linearly polarized light after passing through the first polarizing plate enters the second polarizing plate, the second polarizing plate is configured to shut off the linearly polarized light. The display unit is inclined relative to a light emitting surface (23a) of the light guiding plate.

BRIEF DESCRIPTION OF THE DRAWINGS

The above and other objects, features and advantages of the present disclosure will become more apparent from the following detailed description made with reference to the accompanying drawings. In the drawings.

The above and other objects, features and advantages of the present disclosure will become more apparent from the following detailed description made with reference to the accompanying drawings. In the drawings.

DESCRIPTION OF EMBODIMENTS

The following describes embodiments for carrying out the present disclosure with reference to the drawings. In each embodiment, a part corresponding to the part described in the preceding embodiment may be denoted by the same reference symbol or a reference symbol with one character added to the preceding reference symbol; thereby, redundant explanation may be omitted. In each embodiment, when only part of the configuration is described, the other part of the configuration can be the same as that in the preceding embodiment described above. The present disclosure is not limited to combinations of embodiments which combine parts that are explicitly described as being combinable. As long as no problems are present, the various embodiments may be partially combined with each other even if not explicitly described.

First Embodiment

Figure 1:
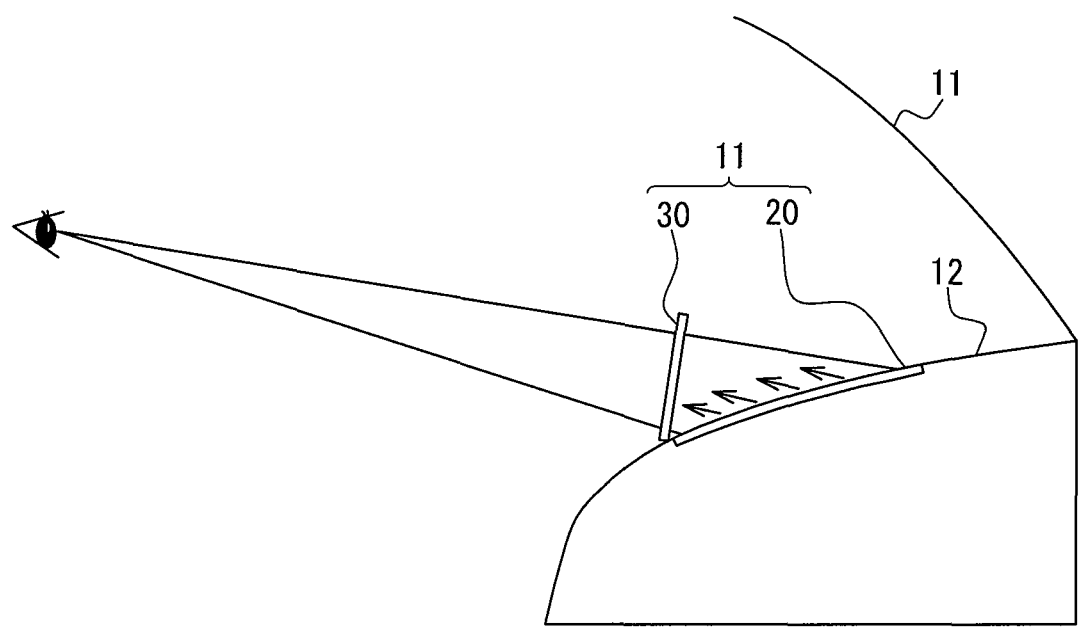
FIG. 1 is a simplified view showing a vehicle display apparatus according to a first embodiment.

Hereinafter, a first embodiment of the present disclosure will be described with reference to FIGS. 1 to 3. The vehicle display apparatus 10 is mounted on a vehicle and displays an image to provide various information to a user. The vehicle display apparatus 10 displays variations in various physical quantities representing the state of the vehicle, such as a vehicle speed and a remaining power of an in-vehicle battery. The vehicle display apparatus 10 further displays various abnormalities on occurrence of the abnormalities and displays an emphasized image. The vehicle display apparatus includes an emitting unit 20 to emit light and a display unit 30 to display an image. As shown in FIG. 1, the display unit 30 and the emitting unit 20 are separate components. The display unit 30 and the emitting unit 20 are in plate shapes. The display unit 30 is inclined relative to the emitting unit 20.

First, the emitting unit 20 will be described with reference to FIG. 3. The emitting unit 20 includes a backlight 21, a first polarizing plate 22, a light guiding plate 23, and a diffusing plate 24. The emitting unit 20 is arranged along the surface of a dashboard 12 located in front of a windshield 11. The light emitted from the backlight 21 passes through the diffusing plate 24, the first polarizing plate 22, and the light guiding plate 23 in this order and is emitted toward the display unit 30.

The backlight 21 is provided on the light incident side of the display unit 30, i.e., on the right side of the display unit 30 in FIG. 1 and emits the light. As shown in FIG. 3, the backlight 21 includes a case 25, which is in a rectangular parallelepiped shape having an opening on its top, and multiple light sources 26 placed in the case 25. The case 25 is formed of a resin material and a metallic material. From a viewpoint of reflecting the light emitted from the light sources 26 on the inner surface of the case 25, the inner surface of the case 25 is desirably white or silver. As the light sources 26, light emitting components in various shapes, such as LEDs as point light sources and cold cathode tubes as linear light sources may be employed. The backlight 21 used in the present embodiment is not limited to the direct light type shown in FIG. 3 and may be of various types such as a side light type in which linear light sources or point light sources are arranged on the lateral surface of the light guide member or a planar light source type.

The diffusing plate 24 is provided between the first polarizing plate 22 and the backlight 21 and diffuses the light emitted from the backlight 21. The diffusing plate 24 is in the form of a plate and closes the opening 25a of the case 25. The diffusing plate 24 is a film or a sheet formed by dispersing and mixing a diffusing agent in a base material made of resin. As the diffusing agent to be mixed and dispersed in the base material, for example, resin, which is different from the base material, or inorganic fine particles can be employed. One kind of the diffusing agent or two or more kinds of the diffusing agent may be employable. In the configuration, the light incident from the lower surface of the diffusing plate 24 is diffused with the diffusing agent and emitted from its upper surface.

The first polarizing plate 22 is provided between the display unit 30 and the backlight 21. The first polarizing plate 22 is in the form of a plate and is stacked on the upper surface of the diffusing plate 24. The light emitted from the upper surface of the diffusing plate 24 is therefore incident from the lower surface of the first polarizing plate 22. The first polarizing plate 22 transmits light having a predetermined polarizing axis, and the transmitted light becomes linearly polarized light. In other words, the first polarizing plate 22 transmits light oscillating in a predetermined direction and regulates the oscillating direction of the light in a predetermined direction. Therefore, the light incident from the lower surface of the first polarizing plate 22 passes through the first polarizing plate 22 and is emitted as linearly polarized light from the upper surface.

The light guiding plate 23 is provided between the display unit 30 and the first polarizing plate 22 with a space from the display unit 30. The light guiding plate 23 is in the form of a plate and is stacked on the upper surface of the first polarizing plate 22. The light emitted from the upper surface of the first polarizing plate 22 is therefore incident from the lower surface of the light guiding plate 23 and is emitted from the upper surface of the light guiding plate 23. The upper surface of the light guiding plate 23 serves as a light emitting surface 23a. The light guiding plate 23 transmits a part of the light, which has passed through the first polarizing plate 22, and guides the transmitted light to be incident on the display unit 30. The light guiding plate 23 is also referred to as a light control film. As shown in FIG. 3, the light guiding plate 23 emits the light at an emission angle of, for example, 45 degrees.

Figure 3:
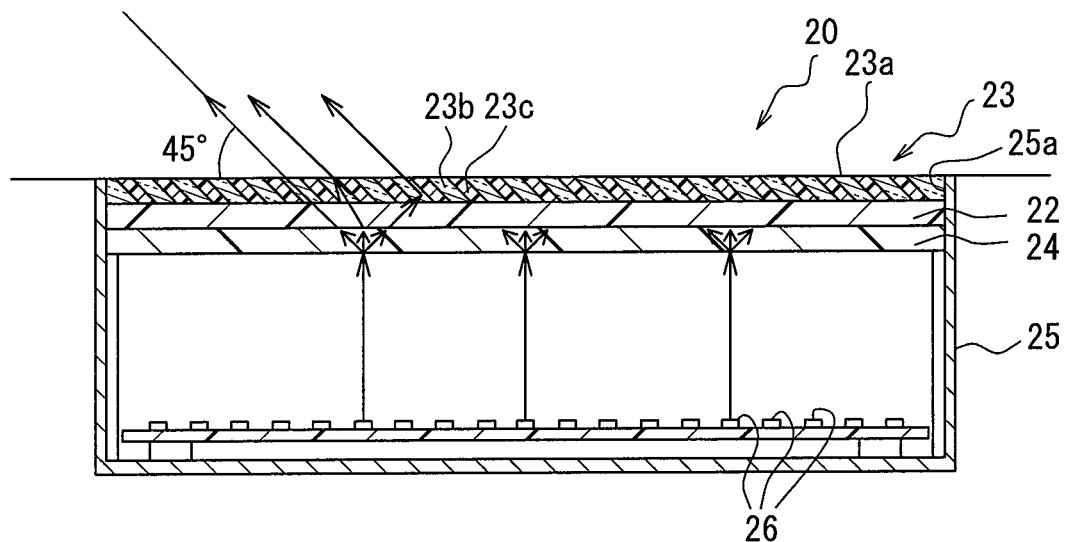
FIG. 3 is a cross-sectional view showing an emitting unit.

As shown in FIG. 3, the light guiding plate 23 includes a plurality of transmitting portions 23b, which have a light-transmitting property, and light shielding portions 23c, which have a light-shielding property. The light transmitting portion 23b and the light shielding portion 23c are alternately arranged. The light transmitting portion 23b and the light shielding portion 23c extend in a direction inclined by, for example, 45 degrees relative to the thickness direction of the light guiding plate 23. In the configuration, the light emitted from the light guiding plate 23 is inclined by 45 degrees. The emission direction of the light guiding plate 23 is determined by the arrangement relationship with the display unit 30. The configuration of the light guiding plate 23 is determined such that more light enters the display unit 30 and that the light does not leak out of the display unit 30.

In this way, the emitting unit 20 is located along the surface of the dashboard 12, and the light emitting surface 23a of the light guiding plate 23 is inclined relative to the display unit 30. In this configuration, the emission direction is inclined from the normal direction of the light emitting surface 23a by using the light guiding plate 23. Specifically, the light emitted from the backlight 21 is diffused through the diffusing plate 24, converted into the linearly polarized light through the first polarizing plate 22, and adjusted in emission direction through the light guiding plate 23. Therefore, the light from the light emitting unit 20 can be emitted toward the display unit 30. Thus, the light incident on the display unit 30 is the light, which has been converted into the linearly polarized light through the first polarizing plate 22.

Subsequently, the display unit 30 will be described. The display unit 30 includes a liquid crystal cell 31 and a second polarizing plate 32. The display unit 30 is raised on the surface of the dashboard 12. The display unit 30 is in contact with the dashboard 12 at a root portion and is affixed to the dashboard 12 at the root portion by using a fastening member such as bolts.

The liquid crystal cell 31 includes a pair of translucent circuit boards, which are opposed to each other via a spacer and spaced from each other at a predetermined distance, and a liquid crystal layer in which liquid crystal is sealed between the pair of translucent circuit boards. Translucent electrodes and oriented films are laminated on the pair of translucent substrates, respectively. The liquid crystal is oriented by application of a voltage between the translucent electrodes according to display data. The liquid crystal cell 31 may employ display systems such as a TN system, an IPS system, a VA system.

Figure 2:
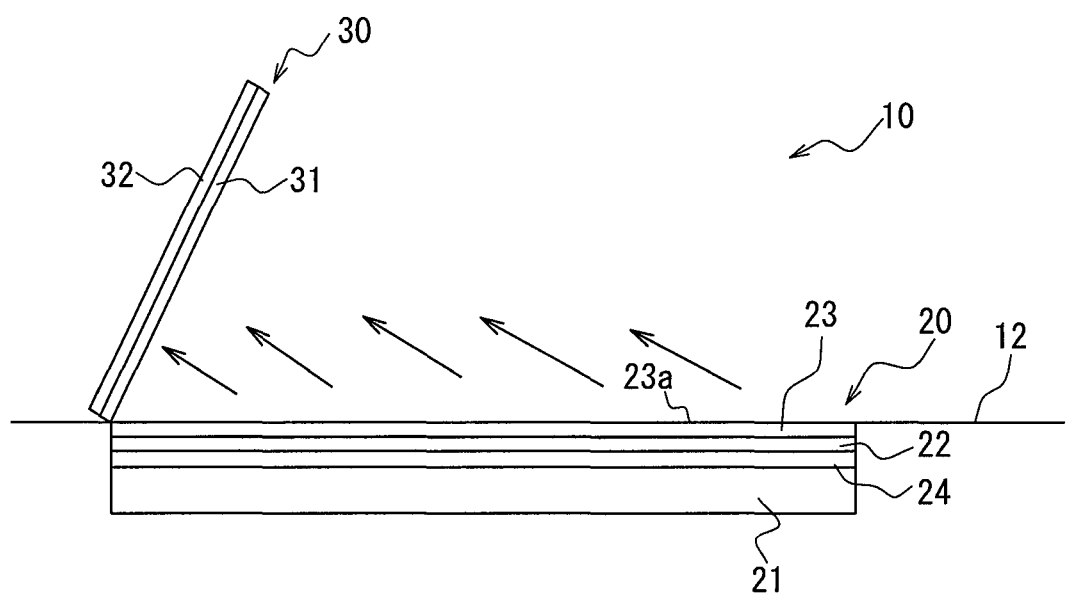
FIG. 2 is a side view showing the vehicle display apparatus.

The second polarizing plate 32 is provided on the light emitting side of the liquid crystal cell 31 and is located on the left side of the liquid crystal cell 31 in FIG. 2. The second polarizing plate 32 is in the form of a plate and is stacked on the surface of the liquid crystal cell 31. The light passing through the liquid crystal cell 31 is incident from the lower surface of the second polarizing plate 32. The second polarizing plate 32 transmits light having a predetermined polarizing axis, and the transmitted light becomes linearly polarized light. In other words, the second polarizing plate 32 transmits light oscillating in a predetermined direction and regulates the oscillating direction of the light in a predetermined direction. Therefore, the light incident from the lower surface of the second polarizing plate 32 passes through the second polarizing plate 32 and is emitted as linearly polarized light from the upper surface.

The polarizing axis of the first polarizing plate 22 and the polarizing axis of the second polarizing plate 32 extend in different directions. When the linearly polarized light after passing through the first polarizing plate 22 enters the second polarizing plate 32, the linearly polarized light is shut off by the second polarizing plate 32. Specifically, the first polarizing plate 22 and the second polarizing plate 32 are arranged so that those oscillation directions are shifted by 90 degrees from each other. As described above, the emitting unit 20 is inclined relative to the display unit 30. Therefore, the first polarizing plate 22 is inclined relative to the second polarizing plate 32.

The vehicle display apparatus 10 includes a flexible wiring board. A terminal provided on a tip of the flexible wiring board is connected to a circuit board on which a microcomputer is mounted. The microcomputer includes a central processing unit, a memory, and the like and executes various arithmetic processing according to a prestored program. An image signal sent from the circuit board to the vehicle display apparatus 10 is transmitted to a translucent electrode of the liquid crystal layer via the flexible wiring board. In the configuration, image contents displayed on the display surface of the display unit 30 is controlled by using the microcomputer.

The circuit board acquires various kinds of information from an electronic control device provided outside the vehicle display apparatus 10 among the electronic control devices in the vehicle and controls the display contents on the display unit 30 according to the acquired information. Specific examples of the information to be displayed include information indicating variation in various physical quantities representing the state of the vehicle, such as a travelling speed of the vehicle and a remaining power of an onboard battery, and information indicating occurrence of various abnormalities.

In the liquid crystal cell 31, when no voltage is applied to the liquid crystal layer, the light passing through the second polarizing plate 32 passes. When the light source 26 of the backlight 21 is turned on, the light emitting surface 23a of the light guiding plate 23 emits light. The light passes through the liquid crystal cell 31 to the front side of the display unit 30. In this way, the display unit 30 is translucently illuminated, and the image displayed on the display surface is visually recognized by the user. Specifically, a light transmission rate (light transmittance) of the pixel varies in accordance with a voltage applied to electrodes of the corresponding pixel of the liquid crystal panel. Thus, the image is formed.

For example, when the applied voltage is controlled such that the transmittance of the respective electrodes corresponding to the red filter, the green filter, and the blue filter is maximized, the luminance of light passing through each of the filters is maximized. Consequently, the corresponding pixel is visually recognized as white. Thus, the light emission color of the light guiding plate 23 is visually recognized. On the other hand, when the applied voltage is controlled such that the transmittance of the respective electrodes corresponding to the respective filters is minimized, the luminance of light passing through each of the filters is minimized. Consequently, the corresponding pixel is visually recognized as black.

As described above, in the vehicle display apparatus 10 of the present embodiment, the display unit 30 and the emitting unit 20 are separate objects. In addition, the light linearly polarized by using the first polarizing plate 22 is guided through the light guiding plate 23 toward the liquid crystal cell 31. Even in the configuration, in which the display unit 30 as a separate object is inclined relative to the light emitting surface 23a of the light guiding plate 23, the light guiding plate 23 is enabled to guide the light toward the liquid crystal cell 31. The display unit 30 is required to be in a region visible to the user to enable the user to view the image. Nevertheless, the configuration enables the emitting unit 20 to be installed at a location away from the user. Installation of the display unit 30, which is required to be close to the user, and installation of the emitting unit 20 at another distant place enable to reduce the installation space close to the user compared with a configuration in which the display unit 30 and the emitting unit 20 as an integrated device are installed close to the user. This configuration enables to enhance the appearance of the display unit 30.

Further, in the present embodiment, when no voltage is applied to the liquid crystal layer of the liquid crystal cell 31, light after passing through the second polarizing plate 32 passes therethrough. The present configuration, in which the display unit 30 and the emitting unit 20 are separate components, enables the display unit 30 to be in a see-through state when the display unit 30 does not display an image. The present configuration enables to enhance the appearance of the display unit 30.

Further, installation of the light guiding plate 23 enables to restrict light from the emitting unit 20 from entering the front window 11. The present configuration enables to suppress window reflection.

Furthermore, the present embodiment further includes the diffusing plate 24 that diffuses light emitted from the backlight 21. Therefore, the configuration enables to diffuse light from the backlight 21 in a planar form. Therefore, the emitting unit 20 is enabled to efficiently emit the light from the backlight 21 toward the display unit 30.

In the present embodiment, the emitting unit 20 is arranged along the surface of the dashboard 12 of the vehicle. The display unit 30 is raised on the surface of the dashboard 12. As described above, those components are separately installed. Therefore, the present configuration enables the downsized display unit 30 to be installed close to the user. The emitting unit 20 is located on the surface of the dashboard 12. Therefore, the present configuration enables to reduce a dead space caused by installation of the emitting unit 20.

Second Embodiment

Figure 4:
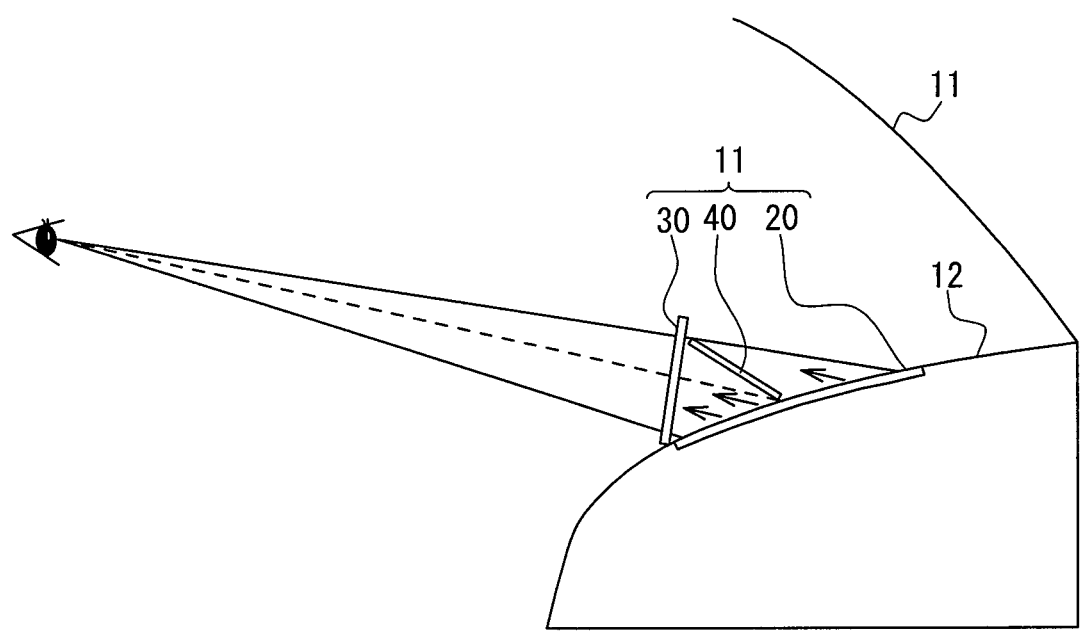
FIG. 4 is a simplified view showing a vehicle display apparatus according to a second embodiment.

Hereinafter, a second embodiment of the present disclosure will be described with reference to FIG. 4. In the present embodiment a decorative ring 40 is provided between the display unit 30 and the emitting unit 20. As shown in FIG. 4, the decorative ring 40 is arranged to be inclined relative to the display unit 30 and the emitting unit 20. The decorative ring 40 is located at a position visually recognized by the user through the display unit 30.

The decorative ring 40 is made of resin, which has translucency, and is in a ring (circular) form. The decorative ring 40 according to the present embodiment is in an annular form. For example, a plurality of grooves are formed on a front surface of the decorative ring 40. These grooves are in streak-like forms extending in the radial direction of the decorative ring 40 to serve as scale marks pointed by the pointer image.

Installation of the decorative ring 40 in this way enables the user to visually recognize the decoration ring 40 in addition to the image displayed on the display unit 30 thereby to exhibit sense of depth of the display. The present configuration enables to further enhance the appearance.

Further, in the configuration, the decorative ring 40 is provided apart from the display unit 30 and the emitting unit 20. Therefore, the scale marks of the decorative ring 40 and various images displayed on the display unit 30 therebetween cause a parallax to exhibit sense of floating. Further, formation of the scale marks on the decorative ring 40 enable clear visual recognition of the scale marks.

Third Embodiment

Figure 5:
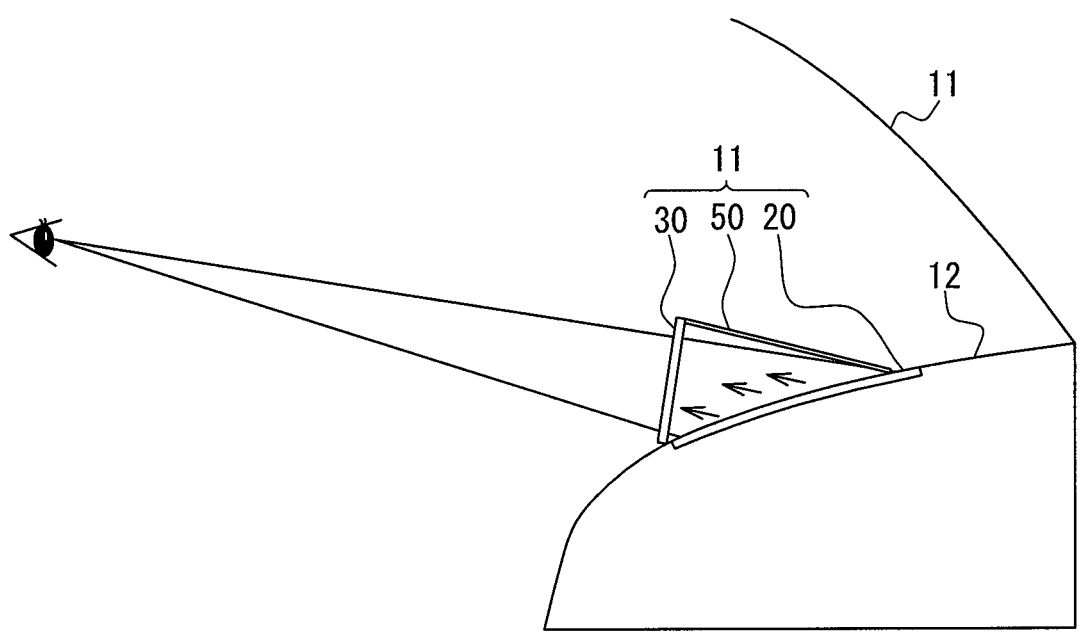
FIG. 5 is a simplified view showing a vehicle display apparatus according to a third embodiment.

Hereinafter, a third embodiment of the present disclosure will be described with reference to FIG. 5. In the present embodiment a half mirror 50 is provided to connect the display unit 30 with the emitting unit 20. As shown in FIG. 5, the half mirror 50 is arranged to be inclined relative to the display unit 30 and the emitting unit 20. The half mirror 50 is located at a position not to be visually recognized by the user through the display unit 30. The half mirror 50 transmits light from the user side toward the front window 11 and reflects light in the opposite direction.

Therefore, when the user views the half mirror 50 through the display unit 30, the half mirror is see-through. Further, the half mirror 50 reflects light incident from the front window 11 toward the display unit 30 and the emitting unit 20. Therefore, the configuration enables to restrict external light from entering the display unit 30 and the emitting unit 20. Therefore, the configuration enables to suppress unevenness in brightness.

Other Embodiments

Although preferred embodiments of the present disclosure have been described above, the present disclosure is not limited to the above-described embodiments, and various modifications are contemplated as exemplified below.

It should be understood that the configurations described in the above-described embodiments are example configurations, and the present disclosure is not limited to the foregoing descriptions. The scope of the present disclosure encompasses claims and various modifications of claims within equivalents thereof.

In the first embodiment, the display unit 30 is raised on the dashboard 12, nevertheless, is not limited to be on the dashboard 12. various configurations, in which the display unit 30 and the emitting unit 20 are separately provided, may be employable.

The first embodiment has a feature of the image display, and installation of a tangible object is not taken into consideration, nevertheless, the first embodiment is not limited to the configuration. The vehicle display apparatus 10 may be equipped with tangible objects as arbitrary combined. For example, the vehicle display apparatus 10 may be equipped with the decorative ring 40, a pointer variable in its angular position, a light emitting device, and the like. The decorative member is not limited to be in a ring form as discussed with the decorative ring 40.

In the above-described vehicle display apparatus, the display unit 30, which includes the liquid crystal cell 31 and the second polarizing plate 32, and the emitting unit 20, which includes the backlight 21, the first polarizing plate 22, and the light guiding plate 23, are separately provided. Further, the display unit is arranged to be inclined relative to the light emitting surface 23a of the light guiding plate.

According to the present disclosure, the display unit 30 and the emitting unit 20 are separately provided. In addition, the light linearly polarized by using the first polarizing plate is guided through the light guiding plate toward the liquid crystal cell. Therefore, even in the configuration, in which the display unit as a separate object is inclined relative to the light emitting surface of the light guiding plate, the light guiding plate is enabled to guide the light toward the liquid crystal cell. The display unit is required to be in a region visible to the user to enable the user to view the image. Nevertheless, the configuration enables the emitting unit to be installed at a location away from the user. Installation of the display unit, which is required for the user, and installation of the emitting unit at another distant place enable to reduce the installation space close to the user and to enhance appearance compared with a configuration in which the display unit and the emitting unit as an integrated device are installed close to the user. The present configuration, in which the display unit 30 and the emitting unit 20 are separate components, enables the display unit 30 to be in a see-through state according to an arrangement state of the liquid crystal layer when the display unit 30 does not display an image. The present configuration enables to enhance the appearance of the display unit.

While the present disclosure has been described with reference to the embodiments thereof, it is to be understood that the disclosure is not limited to the embodiments and constructions. The present disclosure is intended to cover various modification and equivalents. Furthermore, various combination and formation, and other combination and formation including one, more than one or less than one element may be made in the present disclosure.

What is claimed is:

1. A vehicle display apparatus mountable on a vehicle and configured to display an image, comprising:
    a liquid crystal cell including a pair of translucent circuit boards having a liquid crystal layer therebetween;
    a backlight located on a light incident side of the liquid crystal cell, spaced from the liquid crystal cell, and configured to emit light;
    a first polarizing plate located between the liquid crystal cell and the backlight and spaced from the liquid crystal cell;
    a second polarizing plate located on a light outgoing side of the liquid crystal cell;
    a light guiding plate located between the liquid crystal cell and the first polarizing plate and spaced from the liquid crystal cell, the light guiding plate configured to transmit a part of light after passing through the first polarizing plate and to guide the transmitted light to enter the liquid crystal cell;
    a display unit, which includes the liquid crystal cell and the second polarizing plate, and an emitting unit, which includes the backlight, the first polarizing plate, and the light guiding plate, are separately provided, wherein
    a polarizing axis of the first polarizing plate and a polarizing axis of the second polarizing plate extend in different directions,
    in a case where linearly polarized light after passing through the first polarizing plate enters the second polarizing plate, the second polarizing plate is configured to shut off the linearly polarized light,
    the emitting unit is arranged along a surface of a dashboard of the vehicle, the liquid crystal cell of the display unit is raised on the surface of the dashboard, the liquid crystal cell of the display unit is inclined relative to a light emitting surface of the light guiding plate, the light guiding plate includes a plurality of transmitting portions, which have a light-transmitting property, and a plurality of light shielding portions, which have a light-shielding property, the light transmitting portions and the light shielding portions are alternately arranged, and the light transmitting portions and the light shielding portions are inclined relative to a thickness direction of the light guiding plate.

2. The vehicle display apparatus according to claim 1, wherein in a case where the liquid crystal layer is not applied with voltage, the liquid crystal layer is configured to transmit light after passing through the second polarizing plate.

3. The vehicle display apparatus according to claim 1, further comprising:

a diffusing plate provided between the first polarizing plate and the backlight and configured to diffuse the light emitted from the backlight.

4. The vehicle display apparatus according to claim 1, further comprising:

a decorative member having translucency and formed with a decor, wherein the decorative member is provided between the liquid crystal cell and the first polarizing plate and spaced from the liquid crystal cell and the first polarizing plate, and the decorative member is configured to transmit a part of the light from the emitting unit.

* * * * *